Figure 1:
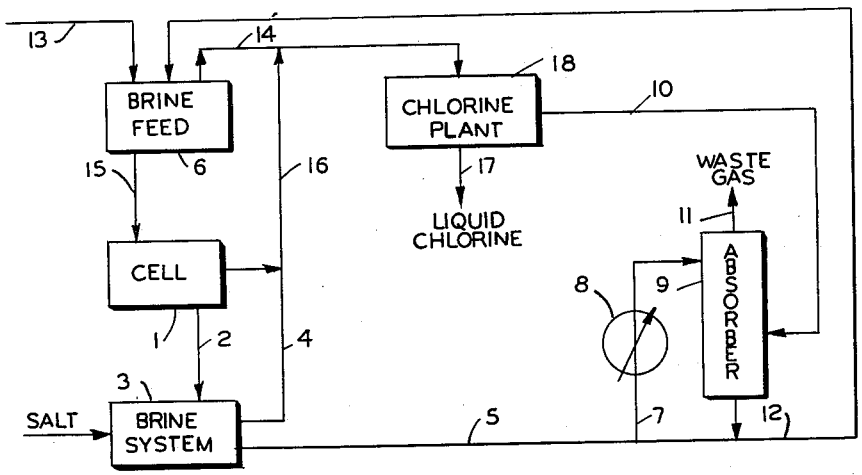

United States Patent Office 3,052,612
Patented Sept. 4, 1962

3,052,612
RECOVERY OF CHLORINE FROM
ELECTROLYSIS OF BRINE
Glen P. Henegar, Saltville, Va., and William C. Gardiner, Niagara Falls, N.Y., assignors to Olin Mathieson Chemical Corporation, a corporation of Virginia
Filed Feb. 16, 1959, Ser. No. 793,326
6 Claims. (Cl. 204—128)

This invention relates to the recovery of chlorine in liquefiable form from dilute gaseous mixtures. More particularly, this invention relates to improvements in the operation of electrolytic chlorine-caustic plants whereby more of the chlorine produced is obtained in liquid form.

Chlorine is commercially produced principally by the electrolysis of brine in electrolytic cells. The cells may be of the diaphragm or mercury type. The brine is usually sodium chloride brine but other alkali metal chlorides, particularly potassium chloride or lithium chloride, may be electrolyzed to obtain chlorine and a caustic alkali. The invention is applicable to the electrolysis of brines of any of the alkali metal chlorides. The gas from electrolytic brine cells is rich in chlorine but is saturated with water vapor. It may also be contaminated by small proportions of hydrogen due to side reactions, by carbon dioxide when carbon anodes are used in the cell and by air (nitrogen and oxygen) when a vacuum system is used to collect the chlorine, or, in a mercury cell plant, when the weak brine from the cell is dechlorinated by aeration and the resulting gas mixture is combined with the effluent gas from the cells. The chlorine stream is cooled and dried, for example, by scrubbing with sulfuric acid, compressed and further cooled in order to liquefy the chlorine.

In the liquefaction of chlorine a residual gas commonly called "blow-off gas" or "sniff gas" is also obtained which is largely composed of the less readily liquefiable constituents of the gas mixture, particularly nitrogen and oxygen in the proportions of air, minor proportions of hydrogen, carbon dioxide when carbon or graphite anodes are used in the cell, and significant proportions of chlorine. The amount of chlorine in the residue gas may normally vary between about 5 and 15 percent by volume of the residue gas although it may be as high as 35 percent when the operation is inefficient or is out of order in the cell, in the brine dechlorination operation or in the liquefying system. It is not economically feasible to waste the chlorine in the blow-off gas and it also constitutes an air pollution problem if discharged to the atmosphere.

Chlorine in the form of blow-off gas has been utilized for the manufacture of chlorinated organics and for the manufacture of hypochlorites or bleach liquor. Recovering the chlorine as such, preferably in liquefiable form, would be economically desirable provided the means do not cost more than the value of the chlorine recovered. The blow-off gas has been scrubbed with water and the chlorine recovered therefrom, for example, by steam stripping. Organic solvents, in which chlorine is more soluble than in water, have been used. Strong salt brines have also been suggested as absorbents for chlorine but they are hardly suitable for use because of the low solubility of chlorine therein. Thus, at 50° C. saturated sodium chloride brine dissolves only about one-fourth as much chlorine as water at about 60 mm. partial pressure. The necessary equipment to absorb a unit weight of chlorine is thus four times as large with the brine as with water. This factor alone makes the use of the brine completely impractical at these partial pressures. At super-atmospheric pressures and higher partial pressures of chlorine, solubility of chlorine is increased but the differential against the use of brine remains substantially the same. The use of super-atmospheric pressures introduces operating hazards since the concentration of the unabsorbed hydrogen in the gas increases until it is in the explosive range with respect to the unabsorbed chlorine and/or oxygen remaining in the gas. These means for recovering chlorine as such from blow-off gas also require significant outlays for installation and operation and leave considerable room for improvement in the economical and safe recovery of the chlorine.

The process of the present invention has the economic advantage of introducing no new materials not already available in an electrolytic chlorine plant and a simple absorber as the only additional piece of equipment. The operation is carried out at substantially atmospheric pressure and is essentially non-hazardous.

In the operation of an electrolytic chlorine plant using mercury cells, the weak brine effluent from the cell, partially depleted in salt content and saturated with chlorine is ordinarily treated for recycle to the cells by dechlorination, suitably with vacuum followed by blowing with air, resaturation by contact with solid salt, purification, particularly with respect to iron and other metals introduced as contaminants with the salt, by the addition of caustic soda, soda ash and/or barium carbonate or barium chloride followed by settling and/or filtration to remove the precipitated metal compounds. The purified alkalized brine is acidified preferably to a pH of about 3 as described in detail in U.S. Patent 2,787,591 and recycled to the cells.

In the operation of diaphragm cells for the production of chlorine and caustic from brines, the cell effluent contains all of the undecomposed salt and the caustic product. The bulk of the salt is removed by crystallization leaving a caustic mother liquor which may be subjected to further purification and/or dehydration to produce commercial caustic products. The precipitated salt is washed to recover most of the caustic and then redissolved to form brine suitable for recycle to the cells.

The recycle brine stream is alkaline due to the addition of caustic for purification in the mercury cell operation or due to incomplete removal of the caustic from the salt by washing in the diaphragm cell operation. Ordinarily the pH of the brine will be above 9.5 and is suitable for use in the process of the present invention. No excess alkali over that normally present in the brine is required for the absorption of the chlorine in the blow-off gas.

In the present process the alkaline brine, instead of being neutralized and/or acidified for return to the cell, is used as the absorbing liquor to remove chlorine from the blow-off gas from the liquefying operation. All or part of the brine circulation may be used as absorbing liquid. It is heated or cooled as desired to maintain proper cell operating temperatures and charged to an absorber. The blow-off gas from liquefaction is preferably counter-currently scrubbed in the absorber with the alkaline brine and substantially all of the chlorine is thus removed from the residue gas. In the absorption process, the alkalinity of the brine is neutralized in whole or in part. Further acidification of the brine is completed to the pH desired for return to the cells, if necessary. By the practice of the process of the present invention, however, requirements of additional acid are reduced. The brine charged to the cells is presaturated with chlorine and thus a larger proportion of the chlorine produced is obtained in concentrated, readily liquefiable form. In effect, the chlorine is absorbed from a dilute gas and recovered as concentrated chlorine gas.

The brine introduced into the absorber has a pH above 9.5. In the absorption of chlorine the pH is reduced to a pH of 6 or lower. The chlorine acts as acidifying agent for the brine and materially decreases the amounts of acid usually required from an extraneous source for neutralization of the brine for use in the cells. The alkalinity of the brine materially increases its effectiveness as an absorbent for chlorine. The large quantities of circulating brine available in an electrolytic plant, all of which requires acidification before re-use in the cells, are ample to recover all the blow-off chlorine resulting from normal operation. Thus by utilizing the alkalinity of the brine, and reducing the pH from above 9.5 to 6 or below, all the blow-off chlorine can be absorbed, much of the acid required for brine neutralization need not be purchased and the dilute chlorine can be recovered as liquefiable chlorine. The proportion of brine to blow-off gas charged to the absorber is increased as the alkalinity of the introduced brine decreases and as the chlorine content of the blow-off gas increases. This control is effected by splitting the alkaline brine stream and, in a suitable proportion, by-passing the absorber.

The brine leaving the absorber is acidic and the chlorine absorbed therein is in the form of chloride and hypochlorite ions, hypochlorous acid and free chlorine in solution. When the brine is further acidified to a pH lower than 5, for example, about 3, the chlorine is largely liberated and thus charged to the cell where it is combined with the new chlorine produced in the cell. The chlorine present in the blow-off gas from the liquid chlorine plant is thus recovered in liquefiable form.

It has been found that chlorine is preferentially absorbed from a gas containing both chlorine and carbon dioxide using alkaline brine as the absorbent. When the absorber is operated so that the effluent brine has a pH of about 4 to 6, it contains substantially no carbon dioxide which, if originally absorbed at the top of the absorber, is subsequently liberated lower in the absorber and leaves with the waste gas from the top of the absorber. Carbon dioxide present in the blow-off gas from liquefaction is thus vented with the waste gas from the absorber even though it may initially be absorbed in the alkaline liquor near the top of the absorber.

Brine temperatures in the absorber may vary between about 15° and 85° C. and preferred temperatures will usually depend on operating conditions elsewhere in the electrolytic plant. Heat losses or heat input in brine treatment, for example, in the saturators, are a factor in determining whether the brine is heated or cooled before or after the absorber. The temperature to be maintained in the cells, the heat generated there, the relative volumes of brine in the cells compared to that in the brine treating and storage plant and the chlorine content of the blow-off gas are other factors. In one particular installation, the temperature of the inlet brine to the absorber is maintained between about 45° and 55° C. for advantageous results.

The absorber is preferably an open tower operating substantially at atmospheric pressure. Either flooded or non-flooded towers can be used but the flooded tower is preferred for safety. The blow-off gas contains hydrogen which frequently is in the explosive range with the oxygen remaining after the chlorine is absorbed. A non-flooded tower may contain a large volume of explosive gas whereas a flooded tower contains only bubbles of unabsorbed gas which present no explosion hazard. Provision may be made for poor operation in the absorber by passing the waste gas through a lime pit before discharge to the atmosphere. The tower may be fabricated of ceramic or plastic lined material. Suitably corrosion resistant metals may be used.

When the absorber is not packed and the gas is introduced through an open pipe, it may be difficult to control the operation to obtain complete recovery of the chlorine although this is possible with a sufficiently high ratio of alkaline brine to gas volume. Preferably the absorber is at least partly packed with Raschig rings or other material suitable to disperse the chlorine. Porous plates or other gas distributing means may be used. It is not necessary that the tower be completely packed as excellent results have been obtained with only a small amount of packing.

Using a brine of about pH 10 and a vent gas containing about 10 percent chlorine in a tower 10 inches in diameter and packed with two feet of 1½ inch Raschig rings above the gas inlet, and about 15 to 20 feet of brine above the gas inlet, substantially complete removal of the chlorine from the gas was obtained with a brine flow of about 5 gallons per cubic foot of gas introduced. When this ratio is reduced below about 4 gallons per cubic foot, the chlorine content of the exit gas may rise above about 0.5 percent and the operation is less satisfactory. An excess of alkaline brine may be used, for example, up to about 6 gallons per cubic foot of gas or more. This guarantees complete removal of the chlorine and also is adequate to absorb temporarily larger proportions of chlorine when the operation in some other part of the electrolytic chlorine plant is out of order. However, the highest ratio of absorbed chlorine to absorbed carbon dioxide is obtained when the exit brine has a pH between about 5 and 6.

Figure 2:
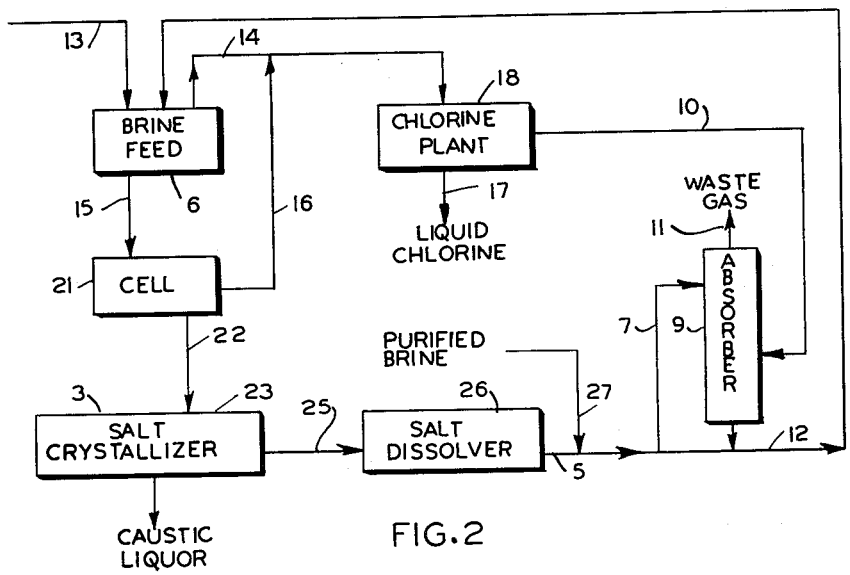

FIGURE 1 shows an electrolytic mercury cell plant flow sheet incorporating the improvement of this invention. FIGURE 2 shows the same improvement applied to the operation of a diphragm cell plant.

In FIGURE 1 the weak brine effluent from mercury cell 1 passes by line 2 to a purification and resaturation system 3 in which the brine is dechlorinated by vacuum followed by aeration, the recovered mixture of air and chlorine being introduced into the chlorine recovery system by lines 4, 16 and 14. The dechlorinated brine is passed through beds of solid salt where it is resaturated. The strong brine is made alkaline to a pH of about 10 by the addition of caustic soda and is settled and filtered to remove precipitated impurities. The clear filtrate is pumped partly to the brine feed tank 6 via lines 5 and 12 and partly by line 7 through a heat exchanger 8 to the top of absorber 9. The blow-off gas from the chlorine plant 18 is introduced into the bottom of the absorber via line 10 and rises countercurrent to the brine. The scrubbed gas now substantially free from chlorine is discharged as waste gas via line 11. The effluent brine in which the chlorine has been absorbed is returned via line 12 to feed brine tank 6. There it is further acidified, if desired, by the introduction of hydrochloric acid via line 13. Any gases vented during the acidification operation pass by line 14 to the chlorine recovery system. Brine passes from the feed tank 6 to cell 1 via line 15. Line 16 carries the gas produced in the cell, augmented by the addition of chlorine containing gas from lines 14 and 4 to the chlorine recovery plant 18 where it is cooled and dried, for example, by scrubbing with sulfuric acid, compressed and liquefied. The liquid product is removed via line 17 and the blow-off gas passes via line 10 to the bottom of absorber 9.

In FIGURE 2 the parts identical with those in FIGURE 1 bear the same numbers. In addition, diaphragm cell 21 discharges cell liquor via line 22 to salt crystallizer 23 from which caustic liquor is removed by line 24. The crystallized salt after washing with water is transferred via line 25 to salt dissolver 26. The effluent alkaline brine fortified by fresh, purified brine introduced by line 27 passes partly by lines 5 and 12 to the feed brine tank and partly by line 7 to the absorber 9 as described in connection with FIGURE 1.

*Example*

A vertically arranged 20 foot length of rubber lined pipe 10 inches in diameter was fitted with a brine inlet and gas outlet at the top and a brine outlet and gas inlet at the bottom. The column was packed to a depth of 2 feet with 1½ inch Raschig rings to insure gas distribution. Brine having a pH of 10 was introduced at the top of the column at a rate of 15 gallons per minute. The brine was obtained by treating the weak brine from electrolytic mercury cells by dechlorination, resaturation with salt, purification by precipitation of heavy metals with caustic and filtration. Blow-off gas containing an average of about 9.5 percent by volume of chlorine was introduced at the bottom of the column at the rate of about 2.8 cubic feet per minute. Brine was removed from the bottom of the column through a piping arrangement which maintained a level of about 17 feet of brine above the gas inlet. The operation was continued for 24 hours under steady conditions. The pH of the outlet brine varied from 4.8 to 5.8 and averaged about 5.6 while the chlorine in the exit gas varied from 0.0 to 0.4 and averaged 0.12 percent over the 24 hour period. Thus, nearly 99 percent of the chlorine in the blow-off gas was absorbed. The outlet brine was returned to the feed brine tank where it was acidified to a pH of about 3 and re-introduced into the cell.

What is claimed is:

1. In the recovery of chlorine produced by the electrolysis of an acid aqueous brine of an alkali metal chloride wherein the chlorine is cooled, dried and compressed to obtain liquid chlorine and a blow-off gas containing nitrogen and oxygen in the proportions present in air and uncondensed chlorine, the improvement of absorbing the chlorine from the blow-off gas by contacting it with recycle alkaline aqueous brine of an alkali metal chloride having a pH above 9.5 until the pH is reduced to below 6 and returning the brine containing absorbed chlorine to the electrolysis.

2. The process of claim 1 in which the brine is a sodium chloride brine.

3. The process of claim 1 in which the alkaline brine is obtained by treating acidic weak brine from the electrolytic process by dechlorination, re-saturation, alkalizing and filtering.

4. The process of claim 1 in which the alkaline brine is obtained by redissolving crystallized alkali metal chloride recovered from the electrolytic process, said chloride carrying alkaline mother liquor therewith.

5. The process of claim 1 in which the brine from the absorbing step is acidified to a pH of about 3 and charged to the electrolysis.

6. The process of claim 1 in which the pH of the effluent brine from the absorption is between about 4 and 6.

References Cited in the file of this patent

UNITED STATES PATENTS

| | | |
|---|---|---|
| 1,847,435 | Low | Mar. 1, 1932 |
| 2,512,973 | Schumacher | June 27, 1950 |

OTHER REFERENCES

"Industrial and Engineering Chemistry," vol. 45, No. 6, June 1953, pp. 1162–72.

General Chemistry, A. W. Laubengayer, Rinchart & Co., N.Y. (1949), pages 258 and 259.

Transactions of The American Electrochemical Society, vol. 46, 1924, pages 23–50.